(12) United States Patent
Hu et al.

(10) Patent No.: US 10,900,447 B2
(45) Date of Patent: Jan. 26, 2021

(54) METHOD AND SYSTEM FOR EMISSIONS REDUCTION

(71) Applicant: Ford Global Technologies, LLC, Dearborn, MI (US)

(72) Inventors: Liangjun Hu, Bloomfield Hills, MI (US); Devesh Upadhyay, Canton, MI (US); Kang Song, Tianjin (CN)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 16/249,657

(22) Filed: Jan. 16, 2019

(65) Prior Publication Data

US 2020/0224614 A1    Jul. 16, 2020

(51) Int. Cl.
| | | |
|---|---|---|
| *F02M 26/40* | (2016.01) | |
| *F02M 26/10* | (2016.01) | |
| *F02B 37/24* | (2006.01) | |
| *F02M 26/06* | (2016.01) | |
| *F02B 37/12* | (2006.01) | |
| *F02M 26/00* | (2016.01) | |

(52) U.S. Cl.
CPC ............. *F02M 26/40* (2016.02); *F02B 37/24* (2013.01); *F02M 26/06* (2016.02); *F02M 26/10* (2016.02); *F02B 2037/122* (2013.01); *F02M 2026/004* (2016.02); *F02M 2026/005* (2016.02)

(58) Field of Classification Search
CPC ........ F02M 26/40; F02M 26/06; F02M 26/10; F02M 2026/005; F02M 2026/004; F02B 37/24; F02B 2037/122
See application file for complete search history.

(56) References Cited

U.S. PATENT DOCUMENTS

| | | | |
|---|---|---|---|
| 5,906,098 A | 5/1999 | Woollenweber et al. | |
| 6,568,173 B1 | 5/2003 | Kolmanovsky et al. | |
| 6,804,952 B2 | 10/2004 | Sasaki et al. | |
| 7,261,086 B2 | 8/2007 | Nuang | |
| 2015/0369101 A1 | 12/2015 | Leone | |
| 2017/0314486 A1 | 11/2017 | Marlett et al. | |

*Primary Examiner* — Audrey K Bradley
*Assistant Examiner* — Edward Bushard
(74) *Attorney, Agent, or Firm* — Geoffrey Brumbaugh; McCoy Russell LLP

(57) ABSTRACT

Methods and systems are provided for coordinated operation of electric variable geometry turbocharger (e-VGT), an exhaust gas recirculation (EGR), and electric motor coupled to the e-VGT for expedited catalyst light-off. In one example, a method may include, during a cold-start, decreasing each of an opening of e-VGT vanes and an opening of an EGR valve while operating the electric motor for braking and reducing the e-VGT speed.

6 Claims, 6 Drawing Sheets

# METHOD AND SYSTEM FOR EMISSIONS REDUCTION

FIELD

The present description relates generally to methods and systems for synchronously adjusting VGT, EGR, and electric motor for expedited catalyst light-off.

BACKGROUND/SUMMARY

Engine emission control systems may include one or more exhaust catalysts such as three-way catalysts, NOx storage catalysts, diesel oxidation catalysts (DOC), light-off catalysts, and SCR catalysts. At catalyst light-off temperature (e.g., operational temperature), the exhaust catalyst may oxidize and reduce exhaust constituents in an exhaust gas, thereby converting toxic gases and pollutants in the exhaust gas to less toxic pollutants or inert constituents which are then released into the atmosphere. As an example, when operated between 200° C. and 600° C., a Selective Catalytic Reduction (SCR) catalyst converts reactive nitrogen oxides (NOx), carbon monoxide (CO) and unburned hydrocarbons (HC) into inert constituents such as diatomic nitrogen ($N_2$), carbon dioxide (CO2), and water ($H_2O$). However, during a cold-start of an engine, when a temperature of the exhaust catalyst is below the light-off temperature (e.g., SCR catalyst temperature falls below 200° C.), the exhaust catalyst may not be able to effectively treat the reactive constituents of the exhaust gas, and as a result, cold-start emissions may increase.

Various approaches are provided for expediting catalyst light-off by adjusting exhaust gas recirculation (EGR) from the exhaust passage to the engine cylinders and/or a position of vanes in an exhaust variable geometry turbine (VGT). In one example approach shown in US 20170314486, Marlett et al. disclose a method for expediting catalyst light-off by increasing exhaust gas backpressure in the exhaust system. During a cold-start, a low-pressure EGR valve may be closed and VGT vanes may be adjusted to restrict a flow of exhaust gas through the VGT to increase the exhaust backpressure.

However, the inventors herein have recognized potential disadvantages with the above approach. As one example, by aggressively closing VGT vanes, desired boost pressure may not be provided for engine operation. By closing of the VGT vanes, compressor speed may not be adjusted as desired. By inhibiting EGR flow, engine dilution demands may not be met, thereby causing combustion instability and/or leading to increased NOx emissions.

The inventors herein have recognized that the issues described above may be addressed by an engine method comprising: during an engine cold-start, decreasing each of an opening of vanes of a variable geometry turbocharger (VGT) and an opening of a valve of an exhaust gas recirculation (EGR) system while controlling a speed of the VGT by adjusting an amount of electric motor braking applied to the VGT. In this way, by coordinating operation of an electric motor along with VGT and EGR adjustments, catalyst light-off may be expedited while maintaining combustion stability.

As one example, an electric turbocharger (also referred herein as e-turbo) may include a variable geometry turbine (VGT) coupled to the exhaust passage and an intake compressor connected via a shaft. An electric motor, powered by a battery, may be coupled to the shaft to increase or decrease compressor speed based on boost demand and turbine speed. An EGR passage may recirculate exhaust from downstream of the VGT to upstream of the compressor. During a cold-start condition, VGT vane opening may be decreased to build exhaust back pressure in the exhaust passage housing the catalyst. The electric motor may be operated in regeneration mode to provide the desired boost pressure. Further, an opening of the EGR passage may also be at least partially closed to further increase the back pressure. During engine operation with higher pre-turbine pressure, fuel injection and oxygen intake may be adjusted to increase exhaust temperature. Due to the increased exhaust back pressure, an entire volume of exhaust may not escape from the engine cylinders, thereby supplying hot, internal EGR for subsequent combustion events. A cost function may be estimated based on fuel efficiency, catalyst temperature, electric motor power, oxygen intake etc. and a trade-off function may be calculated based on engine load, exhaust temperature, intake oxygen, boost pressure, etc. The VGT vane opening, EGR opening, and electric motor operation may be continued to be adjusted based on the cost function and the trade-off function until the catalyst attains its light-off temperature.

In this way, by synchronously adjusting VGT, EGR, and electric motor during a cold-start, catalyst light-off may be expedited and cold-start emissions may be reduced. By providing internal EGR instead of cold, external EGR during the cold-start, combustion stability and fuel efficient may be improved. The technical effect of using the electric turbocharger in regeneration mode during the cold-start is that even with the VGT vanes closed, a desired boost pressure may be maintained. Overall, by adjusting VGT vane opening, EGR opening, and electric motor operation based on the cost function and the trade-off function, engine efficiency and fuel economy may be improved while reducing cold-start emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
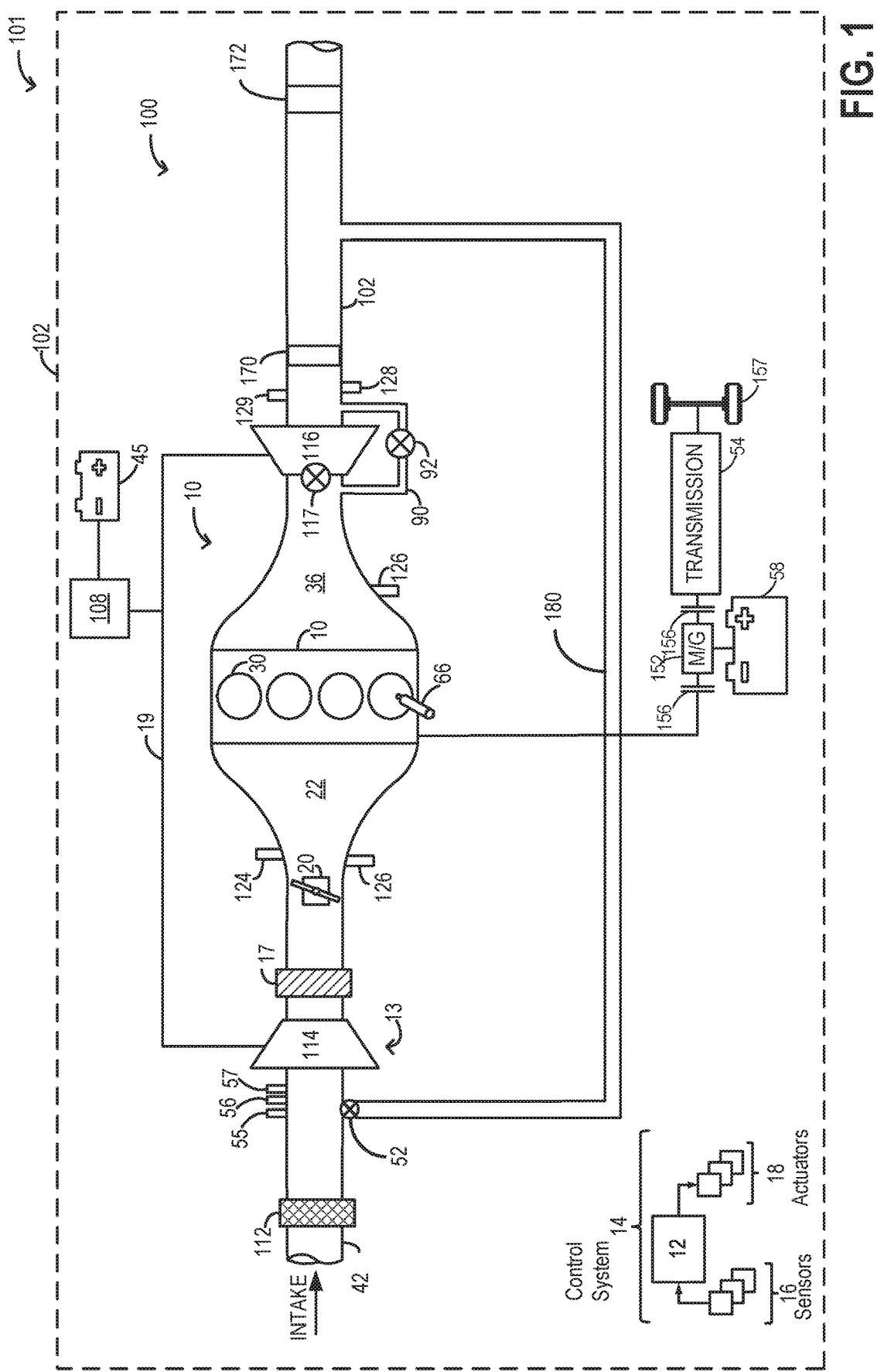
FIG. 1 shows a schematic diagram of an example engine system including a variable geometry turbocharger and an exhaust gas recirculation system.
Figure 6:
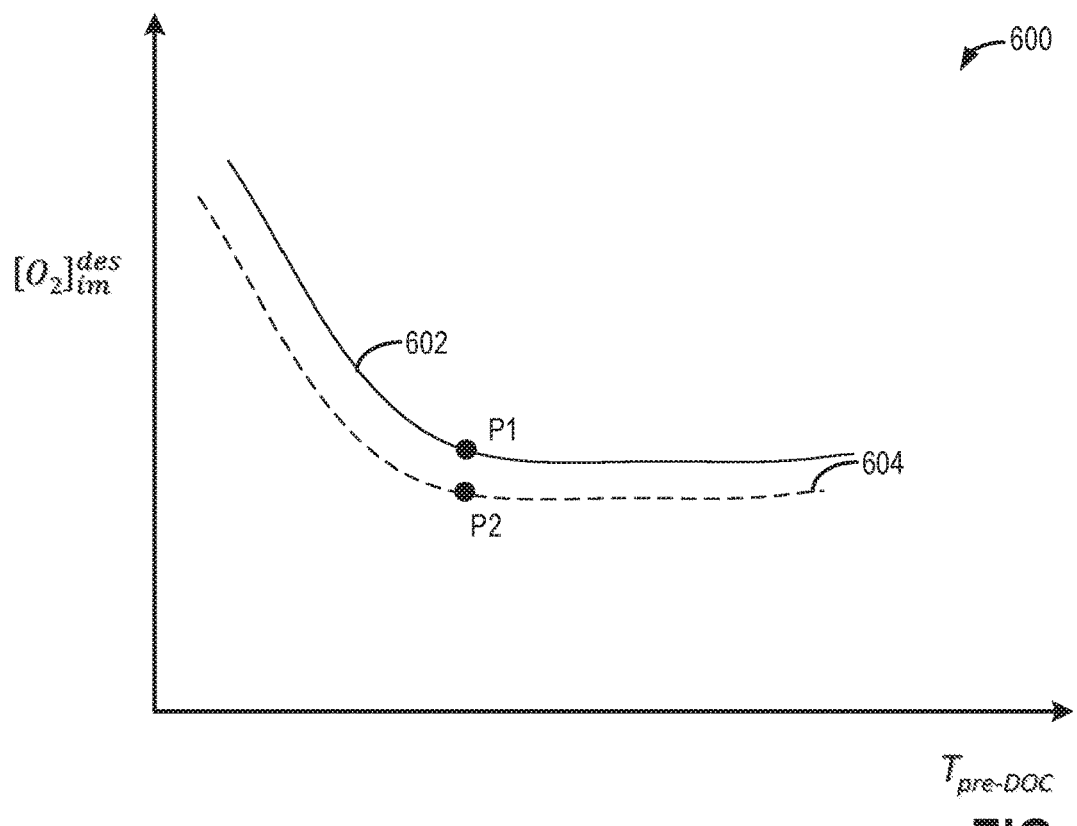
FIG. 6 shows an example plot of variation in desired oxygen intake with exhaust temperature.
Figure 7:
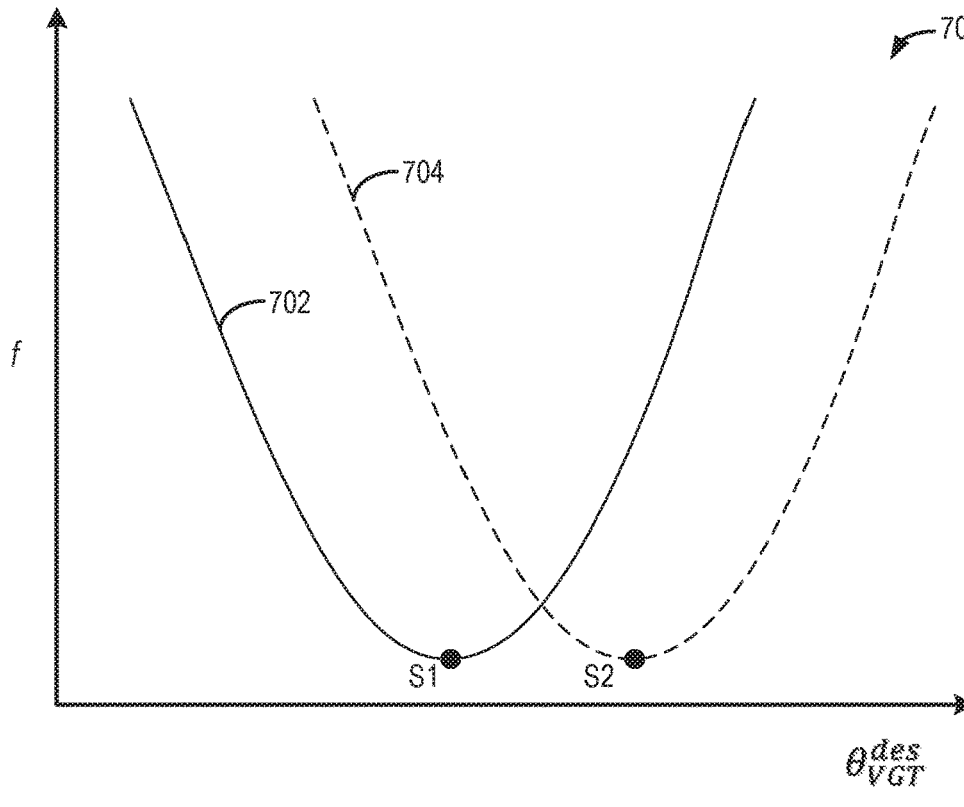
FIG. 7 shows an example plot illustrating a relationship between the trade-off function and VGT vane opening.
Figure 8:
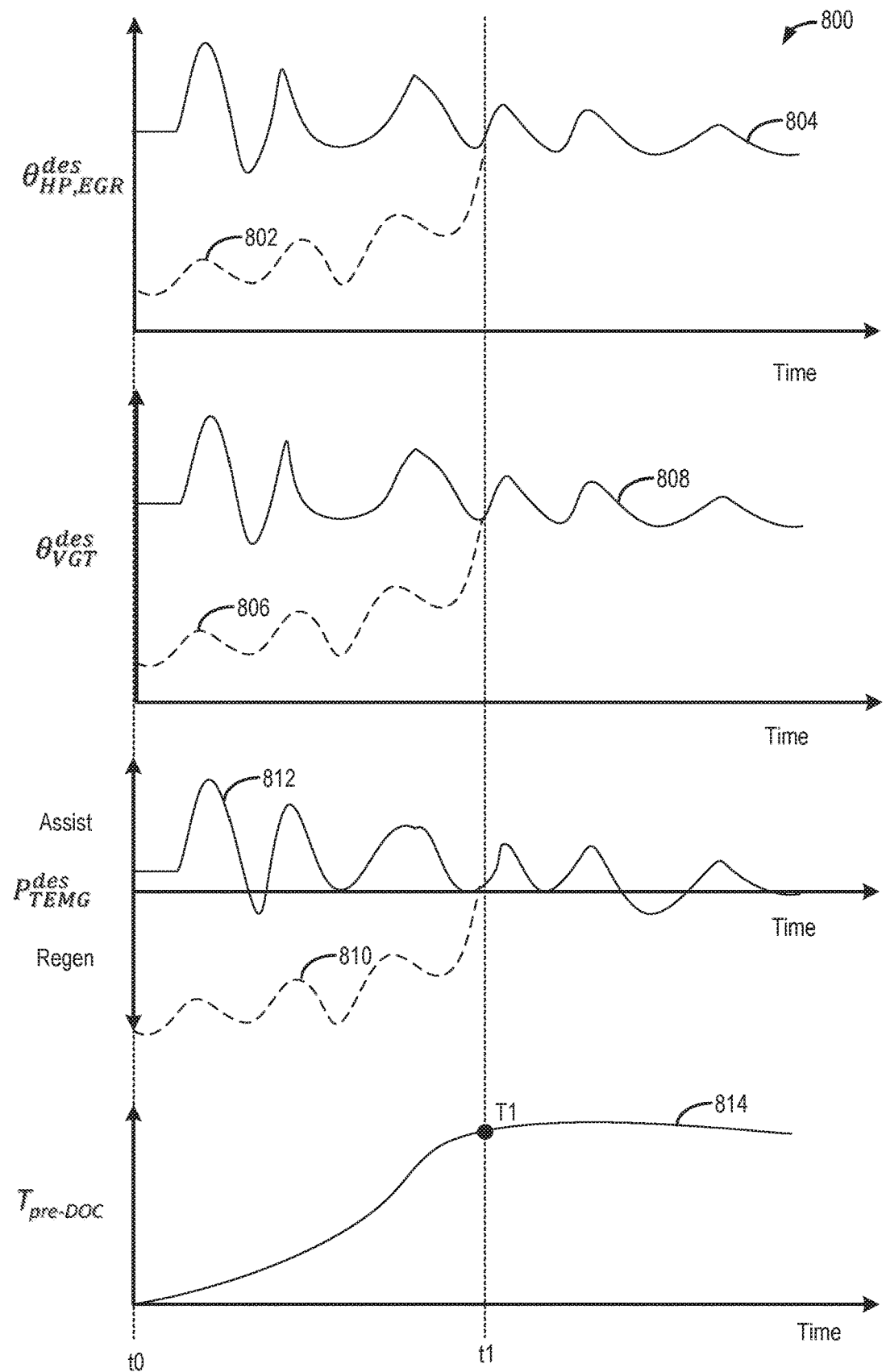
FIG. 8 shows an example of adjustments to VGT vane opening, electric motor operation, and EGR valve position for expedited catalyst light-off.

The following description relates to systems and methods for expedited exhaust catalyst light-off during a cold-start condition. An example engine boosted system including an electric turbocharger with a variable geometry turbine (VGT) is shown in FIG. 1. An engine controller may be configured to perform a control routine, such as the example routine of FIG. 2, to expedite catalyst light-off via adjustments of VGT vane opening, electric motor operation, and/or EGR valve position based on an estimated cost function and a trade-off function. Opening of the VGT, operation of electric motor coupled to the turbocharger, and exhaust gas recirculation (EGR) valve may be controlled by an engine controller based on a plurality of input signals including engine speed, exhaust temperature, torque demand etc. as is shown in the example control systems of FIGS. 3, 4, and 5. An example plot of desired oxygen intake with exhaust temperature is depicted in FIG. 6. An example plot of desired oxygen intake with exhaust temperature is depicted in FIG. 6. An example plot showing a relationship between the trade-off function and VGT vane opening is shown in FIG. 7. Example adjustments to VGT vane opening, electric motor operation, and EGR valve position for expedited catalyst light-off is shown in FIG. 8.

FIG. 1 shows a schematic view 101 of a vehicle system 102 with an example engine system 100 including an engine 10. In one example, the engine system 100 may be a diesel engine system. In another example, the engine system 100 may be a gasoline engine system.

In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

Turbocharger 13 may be further configured as an electric turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as system battery 45. An amount of electrical power delivered to electric motor 108 may be varied in order to adjust the output of the turbocharger. In one example, the amount of electric power delivered to electric motor 108 may be increased to increase the speed of compressor 114. As a result of the electrical assistance, compressor 114 of turbocharger 15 may be rapidly spun up, reducing turbo lag. The electric motor 108 may also be used to charge system battery 45. For example, turbocharger turbine output may be increased over that required to meet the driver torque demand while negative torque is output from the electric motor 108 that may be converted into electric energy for charging battery 45. In still another example, the charging of the system battery may be performed by coordinating the negative torque output from electric motor 108 and electric machine 152.

It will be appreciated that while the depicted example shows the turbocharger configured with electric assistance, this is not meant to be limiting. In still further examples, the engine may be a compound boosted engine system having an electric supercharger or other boost generating device upstream or downstream of the turbocharger in the engine intake. The turbocharger 13 may or may not be configured to receive from electric assistance from electric motor 108. In this case, the electric motor powering the supercharger or other boost device may also be used to brake the compressor and recharge the battery as described.

Electric motor 108 may be configured as a motor-generator and may be used in an assist mode or a regeneration mode. Thus, during conditions when electric assistance is required for boost build-up, the electric motor may be operated in the assist mode to provide positive torque to drive the centrifugal compressor of the turbocharger shaft, to improve the transient boost pressure delivery. While operating in the regeneration mode, the electric motor is capable of energy recuperation by "braking" the motor shaft. Therein, negative torque may be applied to the compressor (or shaft), reducing the compressor speed and concurrently charging the system battery (such as battery 45) coupled to the motor.

The exhaust turbine 116 may be configured as a variable geometry turbine (VGT). The VGT may include a valve 117 which may be adjusted to change the aspect ratio and position of the impeller blades (vanes) of the VGT. As an example, by opening the VGT vanes via a VGT actuator, the aspect ratio of the VGT may be increased, thereby increasing the surface area of the VGT exposed to the exhaust gas flow.

Each vane of the VGT may be mounted and rotatable with respect to the turbine housing via individual pin or axle arrangement. The vanes may be configured to move relative to the turbine housing in order to select a specific aspect ratio of the inlet to the turbine wheel. The vanes may be configured to rotate between a fully-opened, where the entry to the inlet is substantially unrestricted via the vanes being positioned substantially parallel to the flow of exhaust gas, and fully-closed, where the entry to the inlet is blocked via the vanes being positioned substantially orthogonal to the flow of the exhaust gas.

Therefore, by varying the opening of the valve 117, the engine controller 12 may vary the level of energy that is obtained from the exhaust gas flow and imparted to the corresponding compressor. A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn may facilitate reduction in compressor surge and over boosting issues.

The compressor 114 may be coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. A compressor recirculation passage (not shown) may be provided for compressor surge control. Specifically, to reduce compressor surge, such as on a driver tip-out, boost pressure may be dumped from the intake manifold, downstream of the CAC 17 and upstream of throttle valve 20, to intake passage 42. By flowing boosted air from upstream of an intake throttle inlet to upstream of the compressor inlets, boost pressure may be rapidly reduced, expediting boost control. Flow through compressor recirculation passage may be regulated by adjusting the position of a compressor recirculation valve (not shown) positioned therein. The compressor recirculation valve may be a continuously variable valve whose position can be adjusted to a fully open position, a fully closed position, or any position therebetween. Thus recirculation valve may also be referred to as a continuously variable compressor recirculation valve, or CCRV.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

In some examples, intake manifold 22 may include an intake manifold pressure sensor 124 for estimating a manifold pressure (MAP) and/or an intake air flow sensor 125 for estimating a mass air flow (MAF) in the intake manifold 22. Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be a selective catalytic reduction (SCR) catalyst or a diesel oxidation catalyst (DOC) configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust passage 102 after passing through a muffler 172. A low pressure exhaust gas recirculation (LP-EGR) delivery passage 180 may be coupled to the exhaust passage 102 at a location upstream of emission control device 170. A portion of exhaust gas from the exhaust pipe 102 may be delivered from downstream of the turbocharger turbine 116 to the engine intake manifold 22, upstream of a turbocharger compressor 114 as LP-EGR. Opening of an EGR valve 52 may be regulated to control the flow of exhaust from the exhaust passage 102 to the intake manifold 22 via the EGR passage 180. EGR valve 52 may be opened to admit a controlled amount of exhaust gas to the compressor inlet for desirable combustion and emissions control performance. The engine may further comprise a high pressure EGR (HP-EGR) system wherein a portion of exhaust gas from the exhaust pipe 102 may be delivered from upstream of a turbocharger turbine 116 to the engine intake manifold 22, downstream of a turbocharger compressor 114 via a HP-EGR passage. Flow of HP-EGR may be regulated by adjusting the opening of an HP-EGR valve. EGR valves may be configured as a continuously variable valves. In an alternate example, however, EGR valves may be configured as an on/off valve.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

The catalyst 170 may not be fully functional below a light-off temperature and therefore may not be effective in NOx reduction prior to attainment of the light-off temperature. Therefore, during cold-start conditions, when the catalyst temperature is lower than the light-off temperature, one or more engine operating parameters may be modified to expedite attainment of the catalyst's light-off temperature. During a cold start, the opening of the VGT vanes may be adjusted based on the target boost pressure, the temperature of the exhaust catalyst, and a target cylinder oxygen level. The opening of the vanes may decrease with a decrease in the temperature of the exhaust catalyst to increase exhaust back-pressure which in turn may increase exhaust temperature. Also, to further increase the exhaust back pressure while providing a desired level of engine dilution, opening of EGR valve 52 may be adjusted based on the target boost pressure, the temperature of the exhaust catalyst, a target cylinder oxygen level, and an internal EGR amount, the opening of the valve decreasing with an increase in the internal EGR flow rate. The electric motor 108 may be operated in the regeneration mode (braking the VGT speed) to provide a target boost pressure, a speed of operation of the electric motor based on the VGT vane position, the target boost pressure, an engine speed, and catalyst temperature. A method for expedited catalyst heat-up while improving combustion stability is described in details in relation to FIG. 2.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include MAP sensor 124, MAF sensor 126, exhaust temperature sensor 128, exhaust pressure sensor 129, compressor inlet temperature sensor 55, compressor inlet pressure sensor 56, compressor inlet humidity sensor 57, crankshaft sensor, and EGR sensor. Other sensors such as additional pressure, temperature, air/fuel ratio, and composition sensors may be coupled to various locations in engine system 100. The actuators 81 may include, for example, throttle 20, EGR valve 52, VGT actuators 117, wastegate 92, and fuel injector 66.

The control system 14 may include a controller 12. The controller 12 may receive input data from the various sensors, process the input data, and trigger various actuators in response to the processed input data based on instruction or code programmed therein corresponding to one or more routines. Controller 12 may include a proportional integral derivative (PID) controller. For example, the controller may receive an indication of exhaust temperature from exhaust temperature sensor 128 and based on these signals the controller may adjust at least one of the VGT vane position, wastegate valve, electric assist motor 108 operation, and the EGR valve opening via the respective actuators. By making adjustments to the VGT geometry, electric assist motor 108 operation and EGR flow rate, it is possible to control boost and increase exhaust temperature for expedited catalyst light-off. Detailed description of the mentioned controller is discussed with regard to FIGS. 3, 4, and 5.

In some examples, vehicle 102 may be a hybrid vehicle with multiple sources of torque available to one or more vehicle wheels 157. In other examples, vehicle 102 is a conventional vehicle with only an engine, or an electric vehicle with only electric machine(s). In the example shown, vehicle 102 includes engine 10 and an electric machine 152. Electric machine 152 may be a motor or a motor/generator. Crankshaft of engine 10 and electric machine 512 are connected via a transmission 46 to vehicle wheels 157 when one or more clutches 156 are engaged. In the depicted example, a first clutch 156 is provided between crankshaft and electric machine 152, and a second clutch 156 is provided between electric machine 152 and transmission 46. Controller 12 may send a signal to an actuator of each clutch 156 to engage or disengage the clutch, so as to connect or disconnect crankshaft from electric machine 152 and the components connected thereto, and/or connect or disconnect electric machine 152 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 157. Electric machine 152 may also be operated as a generator to provide electrical power to charge traction battery 58, for example during a braking operation.

In this way, the components of FIG. 1 enable a system for a hybrid vehicle comprising: a controller with computer readable instructions stored on non-transitory memory that, when executed, cause the controller to: during a lower than light-off temperature of an exhaust catalyst, operate an electric motor coupled to a variable geometry turbocharger (VGT) in a regeneration mode for braking a speed of the VGT and close vanes of VGT, and after catalyst light-off, operate the electric motor in an assist mode for increasing the speed of the VGT and open the vanes of the VGT.

Figure 2:
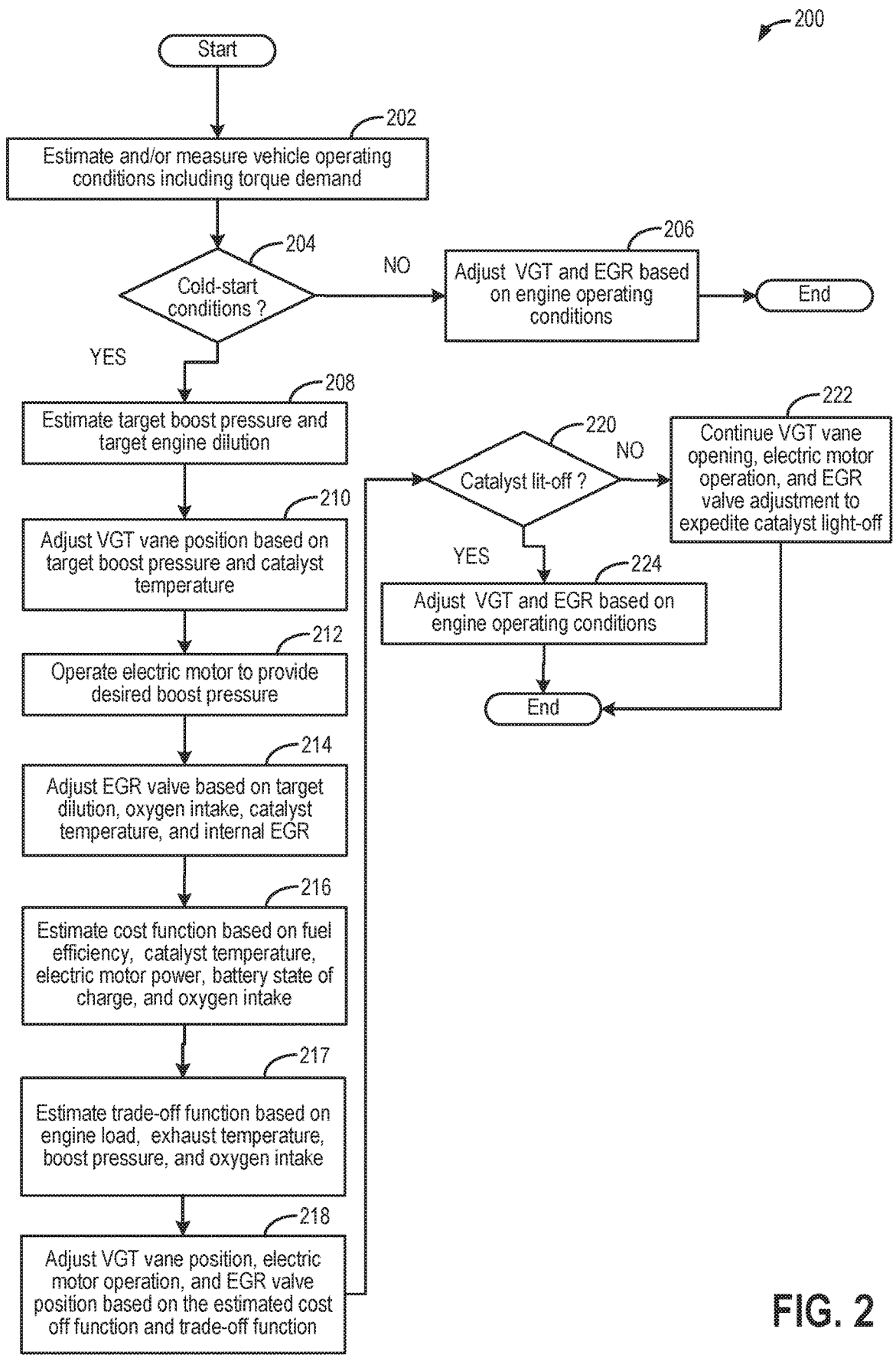
FIG. 2 shows a flow chart illustrating a method that can be implemented to expedite catalyst light-off during a cold-start.

FIG. 2 illustrates an example method 200 that may be implemented for expediting exhaust catalyst (such as the emission control device 170 in FIG. 1) light-off during an engine cold-start condition. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring current engine operating conditions. Conditions assessed may include, for example, engine temperature, engine load, engine speed, manifold vacuum, throttle position, exhaust temperature, engine coolant temperature, exhaust pressure, exhaust air/fuel ratio, boost pressure, etc.

At 204, the routine includes determining if the vehicle engine is operating under cold-start conditions. An engine cold-start condition may be confirmed when the engine is started after a prolonged period of engine inactivity, and when the engine temperature, as estimated via an engine coolant sensor, is lower than a threshold. The threshold may be based on a light-off temperature of the catalyst. Prior to attainment of light-off temperature, the catalyst may not function efficiently, thereby causing deterioration in emissions quality. Cold-start conditions may also be inferred from a lower than threshold ambient temperature.

If cold-start conditions are not confirmed, such as during a hot-start (engine temperature higher than the threshold temperature), at 206, the variable geometry turbine (such as turbine 116 in FIG. 1) vane opening and exhaust gas recirculation (EGR) flow may be adjusted based on engine operating conditions. As such, the VGT vanes may be opened to a higher extent in response to an increase in desired boost pressure while the VGT vanes may be closed to reduce boost pressure, as desired. An electric motor (such as electric motor 108 in FIG. 1) coupled to the turbocharger shaft may be operated in the assist mode to provide increased boost or in the regeneration mode to reduce compressor speed and charge the battery coupled to the motor. Opening of an EGR valve (such as EGR valve 52 in FIG. 1) may be adjusted based on engine dilution demands. In one example, the controller may use a look-up table to determine opening of the EGR valve with engine speed, engine temperature, and engine load as inputs and EGR valve opening (directly proportional to EGR flow rate) as the output.

If cold-start conditions are confirmed, at 208, a target boost pressure and target engine dilution may be estimated. The target boost pressure may be estimated using a look-up table or an operating map with engine speed, engine torque demand, engine temperature, driver torque demand as inputs and the target boost pressure as the output. A target engine dilution may be estimated based on engine operating conditions including engine speed, engine temperature, engine load, etc. In one example, the controller may use a look-up table to determine the target dilution demand with engine speed, engine temperature, and engine load as inputs and the target dilution demand as the output.

Estimating target engine dilution may include estimating desired cylinder oxygen level. The desired cylinder oxygen level may also be based on NOx tailpipe emissions level. The tailpipe NOx emissions level may be inversely proportional to the catalyst temperature (as estimated via an exhaust temperature sensor such as sensor 128 in FIG. 1). During cold-start conditions, prior to catalyst light-off, the desired cylinder oxygen level may be decreased in order to reduce NOx production and emissions.

At 210, VGT vane position may be adjusted based on the target boost pressure and the catalyst temperature. A desired VGT position may be estimated as a function of the target boost pressure. In one example, during cold-start (catalyst temperature below light-off temperature), the VGT vane position may be closed. In another example, the degree of closing of the VGT may be increased (partially closed) relative to the VGT position during a hot-start condition (when expedited catalyst heating is not desired) such that the exhaust gas temperature is increased without compromising the enthalpy flow (combination of exhaust temperature and exhaust flowrate) into the aftertreatment system. As the VGT is increasingly closed, exhaust backpressure may start building upstream of the turbine and upstream of the catalyst. Since exhaust temperature is directly proportional to exhaust pressure, the higher back pressure may cause an increase in exhaust temperature. The increase in exhaust temperature compensates for the reduction in exhaust flow downstream of the VGT, thereby increasing an overall enthalpy flow.

Due to the increased backpressure, engine efficiency may be adversely affected. In order to do the same engine work an amount of fuel injected may be increased. Increased fuel injection may increase the enthalpy of the exhaust gas which may further increase exhaust temperature. In this way, during a cold start, by increasing exhaust back pressure and enthalpy, exhaust temperature and catalyst temperature may be effectively increased.

At 212, the electric motor coupled to the turbine shaft may be operated to provide the desired boost pressure. Since the VGT vanes have been partially or aggressively closed, the turbocharger may over-speed. The compressor speed for providing the desired boost pressure may be adjusted by operating the electric motor. In one example, the electric motor may be operated in a generation mode to brake the speed of the shaft and the compressor to provide the desired boost pressure and inhibit over-speeding. In another example, the electric motor may be used in the assist mode to supply power to the shaft and increase compressor rotation speed for increased boost pressure. In this way, even when the VGT vanes are closed, boost pressure may be maintained for improved engine operation.

At 214, an opening of the EGR valve may be adjusted based on the estimated target engine dilution, oxygen intake (proportional to the throttle opening), catalyst temperature, and internal EGR. A desired EGR valve position (EGR flowrate) may be estimated as a function of the target engine dilution. In one example, during cold-start (catalyst temperature below light-off temperature), the EGR valve may be completely closed. In another example, the degree of closing of the EGR valve may be increased (partially closed) relative to the EGR position during a hot-start condition. Due to closing of the EGR valve, the exhaust back pressure may further increase.

Due the increased exhaust back pressure, the entire amount of combustion by products may not escape from the engine cylinders during the exhaust stroke and may remain within the engine cylinders, thereby providing internal EGR. The temperature of the internal EGR may be higher than the external (low-pressure or high-pressure) EGR. By providing hot EGR instead of cooler EGR, combustion stability may be improved during cold start. In this way, hot, internal EGR may compensate for the cold EGR and provide the target engine dilution.

At 216, a cost function may be estimated based on fuel efficiency, catalyst temperature, electric motor power, state of charge (SOC) of battery powering the electric motor, and a difference between an actual intake oxygen concentration and a desired intake oxygen concentration. The intake oxygen concentration may be estimated based on exhaust air fuel ratio and a desired oxygen concentration may be based on engine torque demand and engine dilution demand. In one example, the cost function may be given by equation 1.

$$J = \int_{t_0}^{t_1} \left( W_1 \frac{\dot{m}_f}{P_{Eng} \frac{1}{n_B - M_G} P_{TEMG}^{regen} + n_B - M_G P_{TEMG}^{assist}} + W_2 NO_x^{TP} + W_3 (X_{oim}^{des} - X_{oim})^2 \right) dt \quad (1)$$

where J is the cost function, $P_{Eng}$ is the engine power, $P_{TEMG}^{regen}$ is the electric motor power operating in regeneration mode, $P_{TEMG}^{assist}$ is the electric motor power operating in assist mode, $\dot{m}_f$ is the fueling rate of the engine, $n_B - M_G$ is the efficiency of the electric motor (a function of SOC of battery powering the electric motor), $NO_x^{TP}$ is the tailpipe NOx emissions as estimated via a tailpipe NOx sensor, $X_{oim}^{des}$ is the desired oxygen concentration, $X_{oim}$ is the actual oxygen concentration, and $W_{1,2,3}$ are adjustable weighing factors.

$$P_{Eng} \frac{1}{n_B - M_G} P_{TEMG}^{regen} + n_B - M_G P_{TEMG}^{assist}$$

is a measure for Brake-specific fuel consumption (BSFC) combining both fuel combustion and energy usage for electric motor operation.

At 217, a trade-off function (f) may be estimated as a function of engine load, exhaust temperature, desired boost pressure, desired oxygen concentration, and actual oxygen concentration. The trade-off function along with the cost function may be used to optimize catalyst light-off, combustion stability, and boost pressure. As an example, the cost function may output a VGT position that optimizes (minimizes) fuel usage and then the trade-off function may search for a relatively suboptimal VGT position that trades-off some of the fuel economy benefit for a hotter exhaust gas temperature and therefore lowers emissions. In one example, this trade-off function (f) may be a multidimensional surface estimated as a function of engine load, the exhaust temperature and the EGR rate.

At 218, VGT vane position, EGR valve position, and electric motor operation may be adjusted based on the estimation cost function and the trade-off function in order to optimize catalyst light-off, combustion stability, and boost pressure. As an example, based on the trade-off function, if the current operating conditions indicate that the emission penalty is higher then the fuel economy benefit to be realized, engine operations may be adjusted (such as increasing exhaust temperature) in favor of meeting emissions.

At 220, the routine includes determining if the catalyst is lit-off such as if the catalyst has attained its light-off temperature. Due to the increased back pressure caused by the closed VGT vanes and the closed EGR valve, the exhaust temperature and in turn the catalyst temperature increases. Once the catalyst is lit-off, NOx conversion may be efficiently carried out at the catalyst, thereby reducing tailpipe emissions. If it is determined that the catalyst is lit-off, it may be inferred that the catalyst is fully functional and exhaust back-pressure may no longer be increased for increasing catalyst temperature. Therefore, at 224, VGT vane position, EGR valve opening, and electric motor operation may be adjusted based on engine operating conditions (as elaborated in step 206). If it is determined that the catalyst temperature is below the light-off temperature, at 222, VGT vane position, EGR valve opening, and electric motor operation may be continued to increase exhaust backpressure and exhaust temperature for expedited catalyst light-off. Also, operation of the electric motor in a regeneration mode may be continued until the engine speed increases to an idling speed. Therefore, the electric motor may be operated in the regeneration mode until a temperature of an exhaust catalyst increases to a light-off temperature and an engine speed reached an idling speed and then the electric motor may be operated in the assist mode.

In this way, during a first engine start, a vane position of an electric variable geometry turbocharger (e-VGT) may be adjusted to a first vane position and a valve position of an exhaust gas recirculation (EGR) system may be adjusted to a first valve opening based on a target boost pressure, and during a second engine start, the vane position to a second vane position may be adjusted and the valve position may be adjusted to a second valve opening based on each of the target boost pressure and a temperature of an exhaust catalyst, a degree of opening in the first vane position higher than a degree of opening in the second vane position and the first valve opening larger than the second valve opening. The first engine start may include a higher than threshold engine temperature and the second engine start may include a lower than threshold engine temperature, the threshold engine temperature based on a light-off temperature of the exhaust catalyst.

Figure 3:
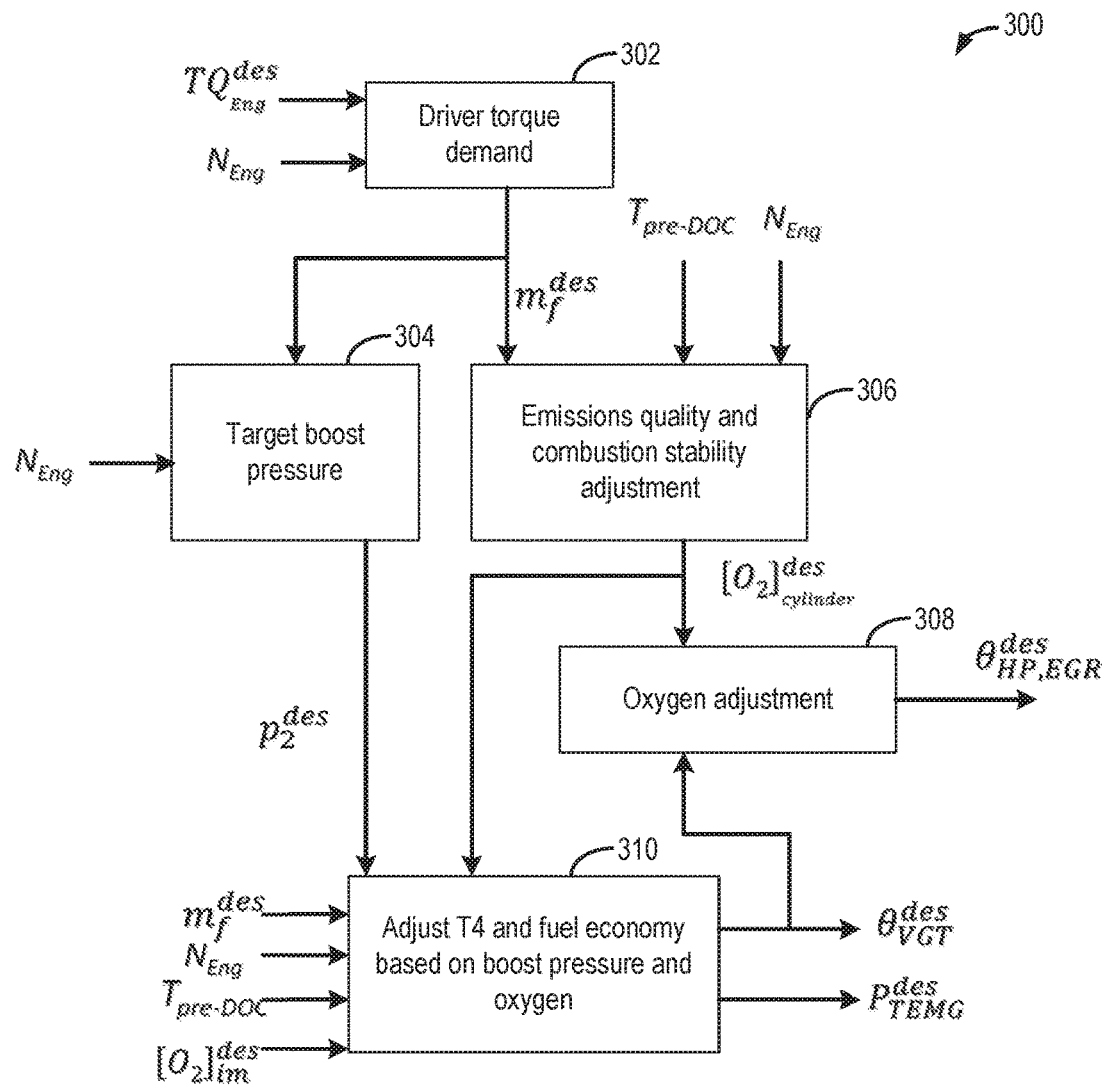
FIG. 3 shows a block diagram of an example control system that may be used for adjusting VGT vane opening, electric motor operation, and EGR valve position for expedited catalyst heating.

FIG. 3 shows a block diagram of an example control system 300 that may be used for adjusting VGT vane opening, electric motor operation, and EGR valve position for expedited catalyst heating. In one example, the control system may be part of the engine controller (such as controller 12 in FIG. 1).

Initially at 302, driver torque demand may be interpreted with engine torque demand ($TQ_{Eng}^{des}$) and engine speed ($N_{Eng}$) as inputs. Based on the driver torque demand, a desired fuel injection amount ($m_f^{des}$) may be estimated. At 304, the desired fuel injection amount ($m_f^{des}$) and engine speed ($N_{Eng}$) may be used as inputs to estimate target boost pressure ($P_2^{des}$). At 306, the desired fuel injection amount ($m_f^{des}$), exhaust temperature upstream of the catalyst ($T_{pre-DOC}$), engine speed ($N_{Eng}$) may be used as inputs for optimizing emissions quality (tailpipe NOx emissions) and combustion stability. By optimizing emissions quality and combustion stability, a desired cylinder oxygen level 1 ($[O_2]_{cylinder}^{des}$) is estimated and at 306, used as an input for adjusting oxygen in the cylinders for attaining the optimum emissions quality and combustion stability. At 308, an engine oxygen tracker may estimate the desired intake oxygen level based on emissions quality and combustion stability. A desired external EGR (high pressure or low pressure) valve opening ($\theta_{HP\_EGR}^{des}$) may be estimated based on the desired intake oxygen level and the desired cylinder oxygen level.

Figure 4:
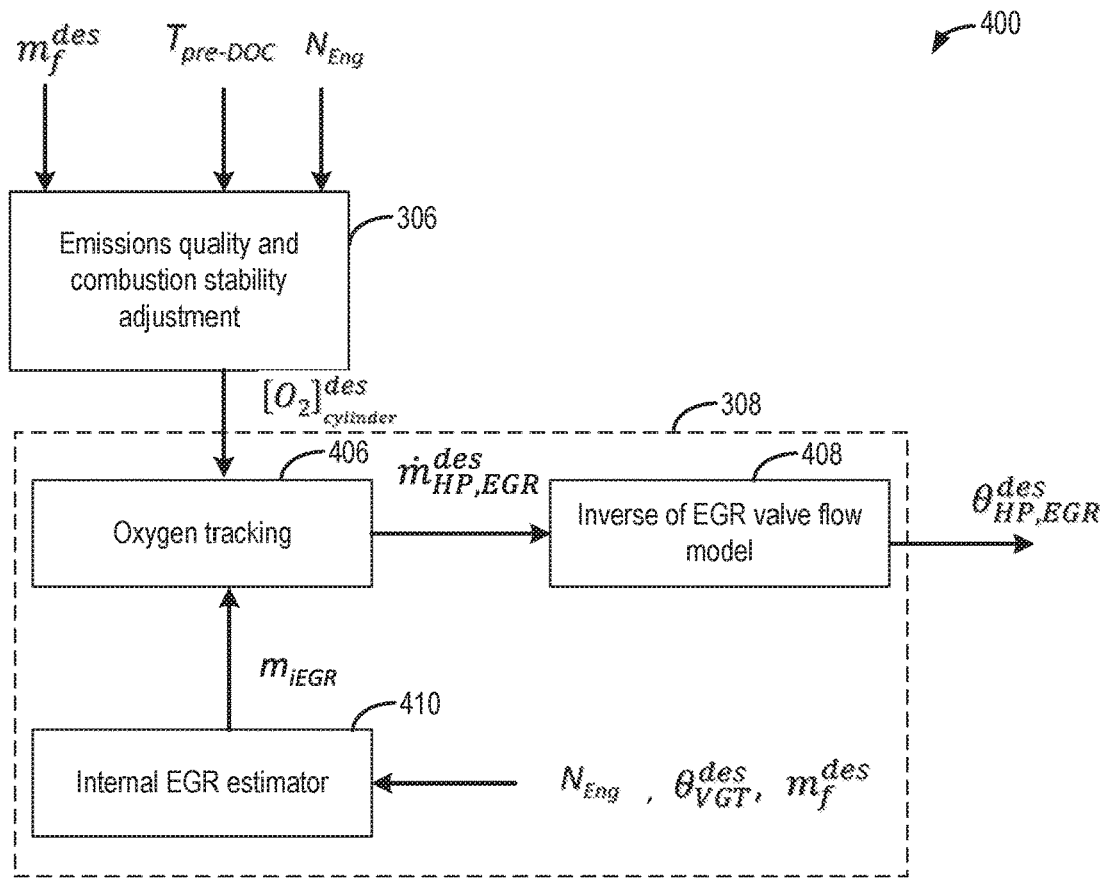
FIG. 4 shows a block diagram of an example control system that may be used for adjusting EGR valve position based on engine oxygen tracking.

The oxygen tracker 308 is elaborated in the example control system 400, as shown in FIG. 4. The oxygen tracker may include an internal EGR tracker 410 which uses engine speed ($N_{Eng}$), a desired VGT vane opening ($\theta_{VGT}^{des}$), and desired fuel injection amount ($m_f^{des}$) as inputs to estimate an internal EGR flow-rate ($m_{iEGR}$). The internal EGR flow-rate ($m_{iEGR}$) and a desired cylinder oxygen level 1 ($[O_2]_{cylinder}^{des}$) may be used as inputs to an oxygen tracking module 406. Based on the desired engine dilution level and the available internal EGR, a desired external (high pressure or low pressure) EGR flow rate ($m_{HP\_EGR}^{des}$) may be estimated. At 408, based on an inverse of EGR valve flow model, the controller may estimate a desired external EGR (high pressure or low pressure) valve opening ($\theta_{HP\_EGR}^{des}$) with the desired external (high pressure or low pressure) EGR flow rate ($m_{HP\_EGR}^{des}$) as input. In this way, the opening of the valve of the EGR system may be adjusted based on the target boost pressure, the temperature of the exhaust catalyst, a target cylinder oxygen level, an exhaust back-pressure, and an internal EGR amount.

At 310, catalyst temperature (T4) and fuel economy may be optimized based on boost pressure and cylinder oxygen content. The optimization module 310, may use desired fuel injection amount ($m_f^{des}$), engine speed ($N_{Eng}$), exhaust temperature upstream of the catalyst ($T_{pre-DOC}$), a desired intake oxygen level ($[O_2]_{im}^{des}$), a desired cylinder oxygen level ($[O_2]_{cylinder}^{des}$), and target boost pressure ($P_2^{des}$) as inputs to optimize catalyst temperature (T4) and fuel economy. Based on the optimization, a desired VGT vane opening ($\theta_{VGT}^{des}$) and a desired electric motor power ($P_{TEMG}^{des}$) may be estimated.

Figure 5:
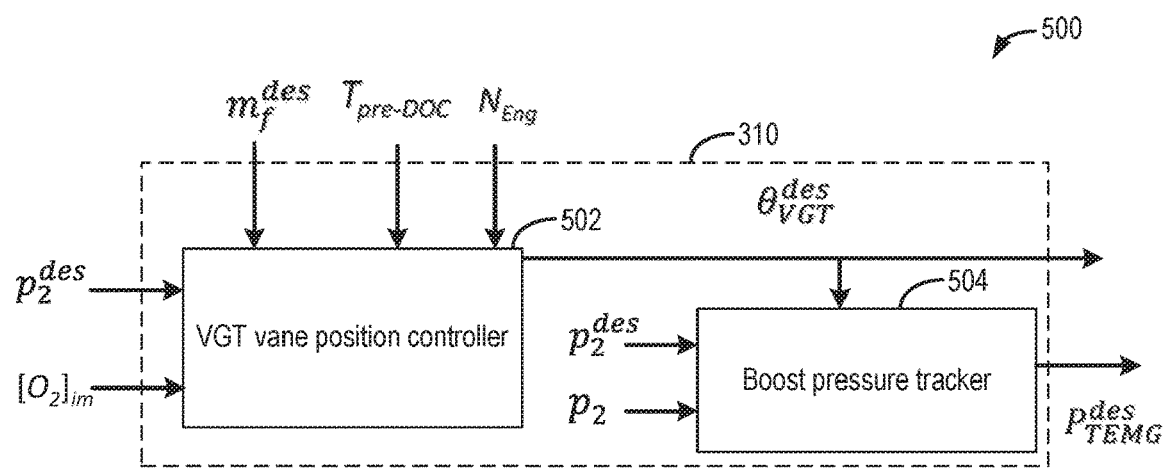
FIG. 5 shows a block diagram of an example control system that may be used for adjusting electric motor operation based on engine oxygen tracking.

The optimization module 310 is elaborated in the example control system 500, as shown in FIG. 5. The optimization module 310 may include a VGT vane position controller 502 which estimates a desired VGT vane opening ($\theta_{VGT}^{des}$) based on each of target boost pressure ($P_2^{des}$) desired intake oxygen level ($[O_2]_{im}^{des}$), desired fuel injection amount ($m_f^{des}$), exhaust temperature upstream of the catalyst ($T_{pre-DOC}$), and engine speed ($N_{Eng}$) as inputs. The desired VGT vane opening ($\theta_{VGT}^{des}$) may be used as input along with target boost pressure ($P_2^{des}$) and an actual boost pressure ($P_2$) to a boost pressure tracker module 504. The desired electric motor power ($P_{TEMG}^{des}$) may be estimated by the boost pressure tracker module 504 such that a desired boost pressure may be maintained for improved engine operation.

In this way, a power supplied to the electric motor coupled to the VGT during operation in the regeneration mode may be based on the opening of the vanes, the target boost pressure, the engine speed, the temperature of the exhaust catalyst, the target cylinder oxygen level, and the engine fueling rate; and the opening of the vanes may be adjusted based on the target boost pressure, the temperature of the exhaust catalyst, and a target cylinder oxygen level. By adjusting the opening of the VGT vanes based on the desired VGT vane opening ($\theta_{VGT}^{des}$) and then operating the electric motor coupled to the VGT with the desired electric motor power ($P_{TEMG}^{des}$), exhaust back pressure may be increased to expedite catalyst warm-up while a desired boost pressure may be provided.

FIG. 6 shows an example plot 600 of variation in desired oxygen intake ($[O_2]_{im}^{des}$ with exhaust temperature upstream of the catalyst ($T_{pre-DOC}$). The first line 602 denotes desired oxygen intake during a cold-start condition where synchronous adjustment of VGT, EGR, and electric motor is not carried out while the second line 604 denotes oxygen intake during a cold-start condition while synchronous adjustment of VGT, EGR, and electric motor is carried out for expedited catalyst light-off. Points P1 and P2 denote desired oxygen intakes corresponding to the catalyst light-off temperature for the first line and the second line, respectively. It is observed that P1 is higher than P2 showing that if the synchronous adjustment of VGT, EGR, and electric motor is not carried out, the desired oxygen intake is higher for the engine and providing a higher level of dilution during cold-start may adversely impact engine out emissions (NOx). Therefore, by concurrently adjusting each of the VGT, the EGR, and the electric motor, engine dilution may be reduced subject to maintaining combustion stability. Such adjustments may maintain engine out NOx emission to desirable levels during cold-start conditions.

FIG. 7 shows an example plot 700 of variation in trade-off function (f) vs. desired VGT vane opening ($\theta_{VGT}^{des}$) with exhaust temperature upstream of the catalyst ($T_{pre-DOC}$) As estimated in step 217 of method 200 in FIG. 2, the trade-off function (f) may be a function of engine load, exhaust temperature, desired boost pressure, desired oxygen concentration, and actual oxygen concentration. The first line 702 denotes the trade-off function (f) during a cold-start condition where synchronous adjustment of VGT, EGR, and electric motor is not carried out while the second line 704 denotes the trade-off function (f) during a cold-start condition while synchronous adjustment of VGT, EGR, and electric motor is carried out for expedited catalyst light-off. Points S1 and S2 denote desired VGT vane opening ($\theta_{VGT}^{des}$) corresponding to the lowest value of the trade-off function for the first line and the second line, respectively. It is observed that S2 is higher than S1 showing that for the lowest trade-off function, if the synchronous adjustment of VGT, EGR, and electric motor is carried out, the desired VGT vane opening ($\theta_{VGT}^{des}$) may be increased thereby providing desired boost pressure while improving fuel economy. In this way, by adjusting the opening of the VGT based on the trade-off function, boost pressure and fuel efficiency may be improved.

FIG. 8 shows an example timeline 800 illustrating synchronous adjustments to VGT vane opening, operation of an electric motor coupled to the VGT, and EGR valve position for expedited catalyst light-off. The horizontal (x-axis) denotes time and the vertical markers t0-t1 identify significant times in the routine for catalyst light-off during a cold-start.

The first plot 804 shows a first desired external EGR (high pressure or low pressure) valve opening ($\theta_{HP\_EGR}^{des}$) when synchronous adjustment of VGT, EGR, and electric motor is not carried out (such as during a hot-start). Dashed line 802 shows a second desired external EGR (high pressure or low pressure) valve opening ($\theta_{HP\_EGR}^{des}$) when synchronous adjustment of VGT, EGR, and electric motor is carried out during a cold-start condition. The second plot 808 shows a first desired VGT opening ($\theta_{VGT}^{des}$) when synchronous adjustment of VGT, EGR, and electric motor is not carried out (such as during a hot-start). Dashed line 806 shows a second desired VGT opening ($\theta_{VGT}^{des}$) when synchronous adjustment of VGT, EGR, and electric motor is carried out during a cold-start condition. The third plot 812 shows a first electric motor power ($P_{TEMG}^{des}$) when synchronous adjustment of VGT, EGR, and electric motor is not carried out (such as during a hot-start). Dashed line 802 shows a second electric motor power ($P_{TEMG}^{des}$) when synchronous adjustment of VGT, EGR, and electric motor is carried out during a cold-start condition. The electric motor, coupled to a turbocharger shaft connecting the exhaust turbine to the intake compressor, may be operated in an assist mode to provide increased boost (by increasing rotational speed of the shaft) or in the regeneration mode to reduce compressor speed (by braking the shaft) and charge the battery coupled to the motor. The fourth plot shows exhaust temperature upstream of the catalyst. Point T1 denotes the light-off temperature of the catalyst.

The engine is started from rest at time t0 under cold-start conditions. The exhaust temperature upstream of the catalyst is lower than the light-off temperature. In order to expedite catalyst light-off, between time t0 and t1, the EGR valve opening is reduced and the VGT opening is reduced relative to the respective EGR valve opening and the VGT opening when synchronous adjustment of VGT, EGR, and electric motor is not carried out. By reducing the VGT opening, exhaust back pressure builds up upstream of the catalyst and causes steady increase in exhaust temperature upstream of the catalyst. Also, by reducing EGR opening, the back pressure increases. During engine operation with higher pre-turbine pressure, fuel injection is increased to further increase exhaust temperature.

Also, the electric motor is operated in the regeneration mode to brake the turbocharger shaft such that a desired boost pressure is maintained even when the VGT opening is reduced. In contrast, if the synchronous adjustment of VGT, EGR, and electric motor is not carried out, the electric motor would have been operated in the assist mode with the VGT open to increase boost pressure. At time t1, the catalyst temperature increases to the light-off temperature and the catalyst starts effectively treating the NOx present in the exhaust gas.

After catalyst light-off (after time t1), the VGT opening is increased based on the current boost demand. Also, the electric motor is operated in the assist mode to provide any further boost pressure, as desired. The EGR valve opening is also increased to provide the desired dilution. Since the exhaust back pressure decreases, internal EGR also decreases and external EGR provides the dilution.

In this way, a synergistic operation of the VGT, EGR, and electric motor may be carried out to increase exhaust temperature during a cold-start for expedited catalyst light-off. The technical effect of operating the electric motor in a regeneration mode during the catalyst warm-up is that boost pressure could be maintained, thereby improving engine efficiency. Further, by increasing exhaust back-pressure, hot, internal EGR may be provided during the cold start, facilitating in engine cylinder warm up.

A method for an engine comprises: during an engine cold-start, decreasing each of an opening of vanes of a variable geometry turbocharger (VGT) and an opening of a valve of an exhaust gas recirculation (EGR) system while controlling a speed of the VGT by adjusting an amount of electric motor braking applied to the VGT. In any preceding example, additionally or optionally, the speed of the VGT is adjusted to provide a target boost pressure, the target boost pressure based on driver torque demand, engine speed, and engine temperature. In any or all of the preceding examples, additionally or optionally, the electric motor is coupled to a shaft of the VGT connecting an exhaust turbine to an intake compressor and during braking of the VGT, the electric motor is operated in a regeneration mode until a temperature of an exhaust catalyst increases to a light-off temperature and an engine speed reached an idling speed and then the electric motor is operated in an assist mode. In any or all of the preceding examples, additionally or optionally, operation in the regeneration mode includes reducing the speed of the intake compressor and charging a battery coupled to the electric motor and wherein operation in the assist mode includes increasing the speed of the intake compressor using power from the battery coupled to the electric motor. In any or all of the preceding examples, additionally or optionally, the opening of the vanes is adjusted based on the target boost pressure, the temperature of the exhaust catalyst, and a target cylinder oxygen level, the opening of the vanes decreasing with a decrease in the temperature of the exhaust catalyst. In any or all of the preceding examples, additionally or optionally, the target boost pressure is a function of the engine speed and the driver torque demand and wherein the target cylinder oxygen level is a function of the engine speed, an engine fueling rate, and the temperature of the exhaust catalyst. In any or all of the preceding examples, additionally or optionally, the opening of the vanes is closed to reduce exhaust flow through the VGT. In any or all of the preceding examples, the method further comprising, additionally or optionally, estimating a power supplied to the electric motor during operation in the regeneration mode based on the opening of the vanes, the target boost pressure, the engine speed, the temperature of the exhaust catalyst, the target cylinder oxygen level, and the engine fueling rate. In any or all of the preceding examples, additionally or optionally, the opening of the valve of the EGR system is adjusted based on the target boost pressure, the temperature of the exhaust catalyst, a target cylinder oxygen level, an exhaust back-pressure, and an internal EGR amount, the opening of the valve decreasing with an increase in the internal EGR flow rate. In any or all of the preceding examples, additionally or optionally, internal EGR is an amount of exhaust gas remaining in an engine cylinder after an exhaust stroke, the internal EGR amount increasing with an increase in the exhaust back-pressure.

Another example method for an engine, comprises: during a first engine start, adjusting a vane position of an electric variable geometry turbocharger (e-VGT) to a first vane position and adjusting a valve position of an exhaust gas recirculation (EGR) system to a first valve opening based on a target boost pressure, and during a second engine start, adjusting the vane position to a second vane position and adjusting the valve position to a second valve opening based on each of the target boost pressure and a temperature of an exhaust catalyst, a degree of opening in the first vane position higher than a degree of opening in the second vane position and the first valve opening larger than the second valve opening. In any preceding example, additionally or optionally, the first engine start includes a higher than threshold engine temperature and the second engine start includes a lower than threshold engine temperature, the threshold engine temperature based on a light-off temperature of the exhaust catalyst. In any or all of the preceding examples, the method further comprising, additionally or optionally, during the first engine start, operating an electric motor coupled to the e-VGT to increase a speed of a compressor of the e-VGT and during the second engine start, operating the electric motor to decrease the speed of the compressor of the e-VGT. In any or all of the preceding examples, additionally or optionally, during the second engine start, the electric motor is operated to provide a target boost pressure, a speed of operation of the electric motor based on the second vane position, the target boost pressure, an engine speed, and a temperature of an exhaust catalyst. In any or all of the preceding examples, additionally or optionally, the first vane position is based on the target boost pressure and wherein the second vane position is based on each of the target boost pressure and the temperature of the exhaust catalyst. In any or all of the preceding examples, additionally or optionally, the first valve opening is based on the target boost pressure and a target cylinder oxygen level and wherein the second valve opening is based on the target boost pressure, the temperature of the exhaust catalyst, the target cylinder oxygen level, and an exhaust back-pressure.

Yet another example engine system, comprises: a controller with computer readable instructions stored on non-transitory memory that, when executed, cause the controller to: during a lower than light-off temperature of an exhaust catalyst, operate an electric motor coupled to a variable geometry turbocharger (VGT) in a regeneration mode for braking a speed of the VGT and close vanes of VGT, and after catalyst light-off, operate the electric motor in an assist mode for increasing the speed of the VGT and open the vanes of the VGT. In any preceding example, additionally or optionally, the engine is a diesel engine and wherein the electric motor, powered by a battery, is coupled to a shaft joining a turbine and a compressor of the VGT. In any or all of the preceding examples, additionally or optionally, the controller includes further instructions to: during the lower than light-off temperature of the exhaust catalyst, adjusting an amount of cold exhaust gas to be recirculation from an exhaust passage to an engine intake based on an amount of hot exhaust gas in engine cylinders, exhaust back pressure, and exhaust temperature. In any or all of the preceding examples, additionally or optionally, adjusting the amount of cold exhaust gas includes closing an exhaust gas recirculation (EGR) valve coupled to an EGR line supplying cold exhaust gas from the exhaust passage to the engine intake.

In another representation, an example method for an engine, comprises: during an engine cold-start, increasing enthalpy of exhaust gas reaching an exhaust catalyst by decreasing an opening of a variable geometry turbine (VGT) while adjusting a speed of the VGT by operating an electric motor coupled to the VGT. In any preceding example, additionally or optionally, enthalpy of the exhaust gas is a combination of exhaust gas flow-rate and exhaust gas temperature, the enthalpy increasing with an increase in at least one of the exhaust gas flow-rate and the exhaust gas temperature. In any or all of the preceding examples, additionally or optionally, adjusting the speed of the VGT includes reducing the speed of the VGT by braking the VGT via operation of an electric machine coupled to a shaft of the VGT joining an exhaust turbine with an intake compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during a first engine start, adjusting a vane position of an electric variable geometry turbocharger (e-VGT) to a first vane position and adjusting a valve position of an exhaust gas recirculation (EGR) system to a first valve opening based on a target boost pressure, and
   during a second engine start, adjusting the vane position to a second vane position and adjusting the valve position to a second valve opening based on each of the target boost pressure and a temperature of an exhaust catalyst, a degree of opening in the first vane position higher than a degree of opening in the second vane position and the first valve opening larger than the second valve opening.

2. The method of claim 1, wherein the first engine start includes a higher than threshold engine temperature and the second engine start includes a lower than threshold engine temperature, the threshold engine temperature based on a light-off temperature of the exhaust catalyst.

3. The method of claim 1, further comprising, during the first engine start, operating an electric motor coupled to the e-VGT to increase a speed of a compressor of the e-VGT and during the second engine start, operating the electric motor to decrease the speed of the compressor of the e-VGT.

4. The method of claim 3, wherein during the second engine start, the electric motor is operated to provide a target boost pressure, a speed of operation of the electric motor based on the second vane position, the target boost pressure, an engine speed, and a temperature of an exhaust catalyst.

5. The method of claim 4, wherein the first vane position is based on the target boost pressure and wherein the second vane position is based on each of the target boost pressure and the temperature of the exhaust catalyst.

6. The method of claim 4, wherein the first valve opening is based on the target boost pressure and a target cylinder oxygen level and wherein the second valve opening is based on the target boost pressure, the temperature of the exhaust catalyst, the target cylinder oxygen level, and an exhaust back-pressure.

* * * * *